US006661887B1

(12) United States Patent
Wallenius

(10) Patent No.: US 6,661,887 B1
(45) Date of Patent: Dec. 9, 2003

(54) SERVICE INTERACTION IN AN INTELLIGENT NETWORK

(75) Inventor: Jukka Wallenius, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/509,584

(22) PCT Filed: Sep. 23, 1998

(86) PCT No.: PCT/FI98/00746

§ 371 (c)(1),
(2), (4) Date: Mar. 24, 2000

(87) PCT Pub. No.: WO99/18706

PCT Pub. Date: Apr. 15, 1999

(30) Foreign Application Priority Data

Sep. 25, 1997 (FI) .................................................. 973787

(51) Int. Cl.⁷ ................................................. H04M 3/42
(52) U.S. Cl. ............. 379/219; 379/201.01; 379/207.02; 379/221.08; 379/227.09
(58) Field of Search ............................ 379/219, 201.01, 379/207.02, 221.08, 221.09, 220.1, 230; 370/259

(56) References Cited

U.S. PATENT DOCUMENTS

| 5,337,351 | A | | 8/1994 | Manabe et al. | |
|---|---|---|---|---|---|
| 5,448,631 | A | | 9/1995 | Cain | |
| 5,652,834 | A | | 7/1997 | Jansson | |
| 5,657,451 | A | | 8/1997 | Khello | |
| 5,822,419 | A | * | 10/1998 | Enstone et al. | 379/207 |
| 5,937,053 | A | * | 8/1999 | Lee et al. | 379/220 |
| 6,526,134 | B1 | * | 2/2003 | Wallenius | 379/201.01 |

FOREIGN PATENT DOCUMENTS

| EP | 509 705 | 10/1992 |
|---|---|---|
| EP | 576 864 | 1/1994 |
| EP | 724 370 | 7/1996 |
| EP | 725 525 | 8/1996 |
| FI | 502 733 | 12/1995 |
| WO | 95/07593 | 3/1995 |
| WO | 95/18503 | 7/1995 |
| WO | 95/20854 | 8/1995 |
| WO | 95/22222 | 8/1995 |
| WO | 95/22231 | 8/1995 |
| WO | 98/21899 | 5/1998 |
| WO | 98/44707 | 10/1998 |

OTHER PUBLICATIONS

"Intelligent Network (IN); Intelligent Network Capability Set 1 (CS1); Core Intelligent Network Application Protocol (INAP); Part 1: Protocol Specification," *European Telecommunications Standards Institute*, Sep. 1994.
"Intelligent Network Distributed Functional Plane Architecture," *International Telecommunication Union*, Mar. 1993.

* cited by examiner

Primary Examiner—William J. Deane, Jr.
(74) Attorney, Agent, or Firm—Pillsbury Winthrop LLP

(57) ABSTRACT

A database is formed for providing two intelligent network services in connection with the same call, the database comprising data on the mutual compatibility of the different intelligent network services. In connection with each such call which involves at least one first intelligent network services and one second intelligent network service, an exchange receives the data on the first intelligent network services. If this data is sufficient for arming detection points, the exchange arms the detection points from which the first intelligent network services will be activated if the activation criteria are met during the call. The exchange also determines the data for arming a second detection point from which the second intelligent network service will be activated if the activation criteria are met during the call. The exchange examines the compatibility of the second intelligent network service with the first intelligent network services on the basis of the compatibility database and uses the result of the examination to route the call.

16 Claims, 3 Drawing Sheets

SERVICE INTERACTION IN AN INTELLIGENT NETWORK

BACKGROUND OF THE INVENTION

The invention relates to a mechanism for setting up calls and providing subscribers with services, which mechanism improves the operation of an intelligent network.

A subscriber in a telecommunications network, for example in a wired network or a mobile telephone network, can be provided with a great number of different services by an intelligent network (IN). Such services include a virtual private network (VPN) which enables short numbers to be used between the subscribers belonging to a local network, and a personal number in which the intelligent network reroutes the calls made to the personal number in a manner controlled by the subscriber. An example of this kind of intelligent network is described in the recommendations of the Q-1200 series of ITU-T, of which the recommendations Q-1210 to Q-1219 define a group of features called CS-1 (Capability Set 1), and Q-1220 to Q-1229 define a group of features called CS-2, correspondingly. The invention and its background are described using the CoreINAP terminology of the ETS 300 374-1 recommendation, but the invention can also be used in intelligent networks implemented by other intelligent network standards.

A basic call state model (BCSM) defined in connection with an intelligent network describes the different phases of call control and comprises the points in which the call control can be interrupted in order to activate a service of the intelligent network. It identifies the detection points in the call and connection process in which the service logic objects of the intelligent network can interact with basic, call and connection management features.

In the conventional call setup which takes place without the assistance of an intelligent network, telephone exchanges independently make all inferences related to call routing. Intelligent network architecture involves one or more service control functions (SCF). An apparatus or a network element which performs the tasks assigned to the SCF is called a service control point (SCP). Within the scope of the present application the SCF and the SCP are equal and referred to as the SCP below. The SCP gives the exchange call setup instructions or the exchange can query the SCP for call setup instructions. If, for example, a B-subscriber connection is deemed busy at some phase of the call setup, the call can be directed to an alternative number. FIG. 1 shows also other intelligent network elements significant for understanding the invention, such as a call control function (CCF) which comprises the high level call processing functions of the exchange, such as setting up and releasing transmission connections. A service data function (SDF) and service data point (SDP) form a database comprising subscriber- and/or service-specific data. A specialized resource function (SRF) is an interface for network mechanisms related to interaction with a subscriber. It can be associated with so-called intelligent peripherals (IP) which comprise more sophisticated call processing functions than do the exchanges in general.

A service switching function (SSF) is an interface between the call control function CCF and the service control function SCF. A network element performing the SSF function is called a service switching point SSP. An intelligent network service is provided in such a manner that in connection with an encounter of the detection points related to the services, the service switching point SSP queries the service control point SCP for instructions by means of messages transmitted over an SSP/SCP interface. In intelligent network terminology these messages are called operations. In connection with the intelligent network service, a service program whose activity determines the operations that the SCP transmits to the SSP at a particular call phase is activated in the service control point (SCP).

FIG. 2 shows the operation of a prior art intelligent network in detection points. In step 2-1, an SSP sends an SCP an InitialDP operation which comprises the necessary data for setting up a call. Next, the detection points are armed in the SSP. In step 2-2, the SCP sends the SSP a Request Report BCSM Event message which informs the SSP which detection point encounters it must report to the SCP. Next, in step 2-3, the SCP typically transmits charging and/or interaction operations, such as Furnish Charging information (store computational information related to the intelligent network service) or Play Announcement (give the subscriber an announcement related to the intelligent network). In step 24, the SCP sends the SSP a routing instruction, such as Collectinformation (collecting selection information from the subscriber), Connect (route the call to a new number), Continue (continue the call setup by the same information) or ReleaseCall (disconnect). In the intelligent network recommendations, call setup is divided into certain coarse phases called points-in-call (PIC). The SSP may have been defined to continue the call setup in response to the Collectinformation operation from phase PIC 2, and to continue the call setup in response to the Connect operation from phase PIC 3, etc.

There are two kinds of detection points. The above events of FIG. 2 relate to a detection point which is called a trigger detection point (TDP). The SSP can make an initial enquiry to the SCP in connection with such a TDP detection point and the SSP receives in it instructions for setting up a call. The other type of detection points is a so-called event detection point (EDP). In FIG. 2, step 2-5 shows an occasion when such an EDP detection point is encountered during call setup. The SSP reports the encounter of the detection point to the SCP which sends it more-call setup instructions in step 2-7. The intelligent network architecture described above can also be applied to a mobile communications system, when the exchanges (EXC) would be replaced by a mobile switching centre (MSC).

A problem in the known intelligent network architectures is that services that are formed at an early stage of a call which demand a control relationship for longer than the duration of one detection point prevent the services from becoming activated. A practical such a service could be a private numbering plan or a personal number providing a rerouting to an alternative number. Two or more such services cannot thus be activated simultaneously to one half of a call in the same exchange. For a service provider and user, this results in the problem that services of a particular type cannot be implemented simultaneously in the same exchange to the same subscriber.

BRIEF DESCRIPTION OF THE INVENTION

An object of the invention is thus to provide a method for providing services so as to solve the above problems related to producing several simultaneous services. The objects of the invention can be achieved by methods and equipment characterized by what is said in the characterizing parts of the independent claims. The preferred embodiments and applications of the invention are disclosed in the dependent claims.

Within the scope of the present application, intelligent network services are divided into second and first intelligent network services depending, correspondingly, on whether the data required to activate the intelligent network services can be transmitted on the signaling connection between the exchanges or not. In other words, the "first intelligent network services" refer to such intelligent network services the data on which can be obtained already in an early phase of the call before a number and subscriber analysis. A first intelligent network service can be activated either in an early phase of the call, or alternatively, it can be activated during the call by a function activated by a subscriber from the terminal during the call. The data to activate the first intelligent network services cannot thus be transmitted on the signaling connection between the exchanges. Correspondingly, the "second intelligent network services" refer to such intelligent network services the data on which can only be obtained later during the call setup, for example on the basis of a subscriber number analysis or subscriber data analysis. Such subscriber data includes a calling subscriber number or class. Second intelligent network services can also be activated from a next exchange, since the data required to activate them can be transmitted on the signaling connection between the exchanges. "Service activation" means that an enquiry for providing a service is performed to the intelligent network control point, in other words a so-called SCP enquiry is performed.

The invention can be implemented, for example, in such a manner that information on the mutual compatibility of different intelligent network services is maintained and in connection with each call which involves at least one first intelligent network service and one second intelligent network service:

(1) An exchange receives—from a subscriber database, subscriber interface data or input line data, for example—the data on the first intelligent network services requiring an SCP enquiry.

(2) If this data is sufficient for arming detection points, the exchange arms the detection points from which the first intelligent network services will be activated if the activation criteria are met during the call.

(3) The exchange determines (on the basis of a selected number analysis and/or subscriber data analysis) also the data for arming a second detection point from which a second intelligent network service will be activated if the activation criteria are met during the call.

(4) The exchange examines the compatibility of the second intelligent network service with the first network services, and if the second intelligent network service is compatible with all first intelligent network services, the exchange routes the call to a second exchange for providing the second intelligent network service if the second intelligent network service cannot be provided from the first exchange.

(5) If there are more than one first intelligent network service, steps 3 and 4 are repeated until all data related to the call setup is analyzed.

Similarly, steps 3 to 5 can be repeated as long as the data affecting the call setup is changed as a result of the SCP enquiry and/or the conversion of the call setup information, which is performed by the exchange itself. The repetition of steps 3 to 5 can only occur if the same exchange allows an SCP enquiry relating to two intelligent network services on the basis of a compatibility analysis and none of the first services has set up a control relationship.

BRIEF DESCRIPTION OF THE DRAWINGS

The invention is now described in closer detail in connection with the preferred embodiments with reference to the accompanying drawings, in which.

DETAILED DESCRIPTION OF THE INVENTION

Figure 1:
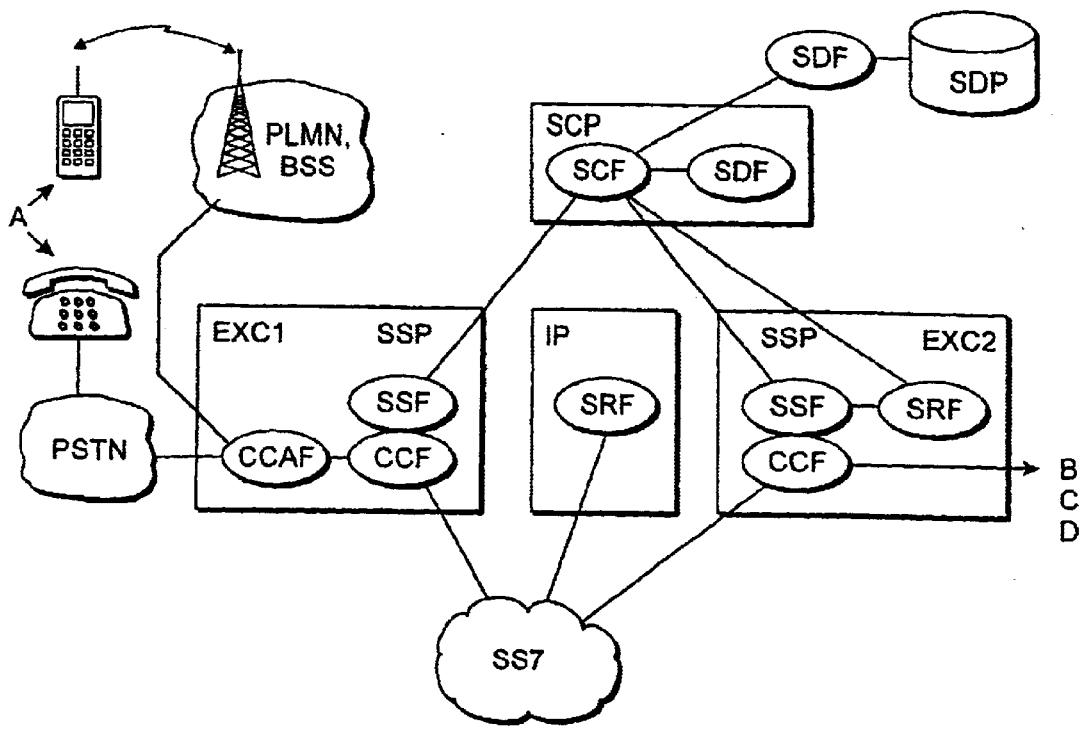
FIG. 1 shows prior art intelligent network architecture parts that are relevant for the invention.
Figure 2:
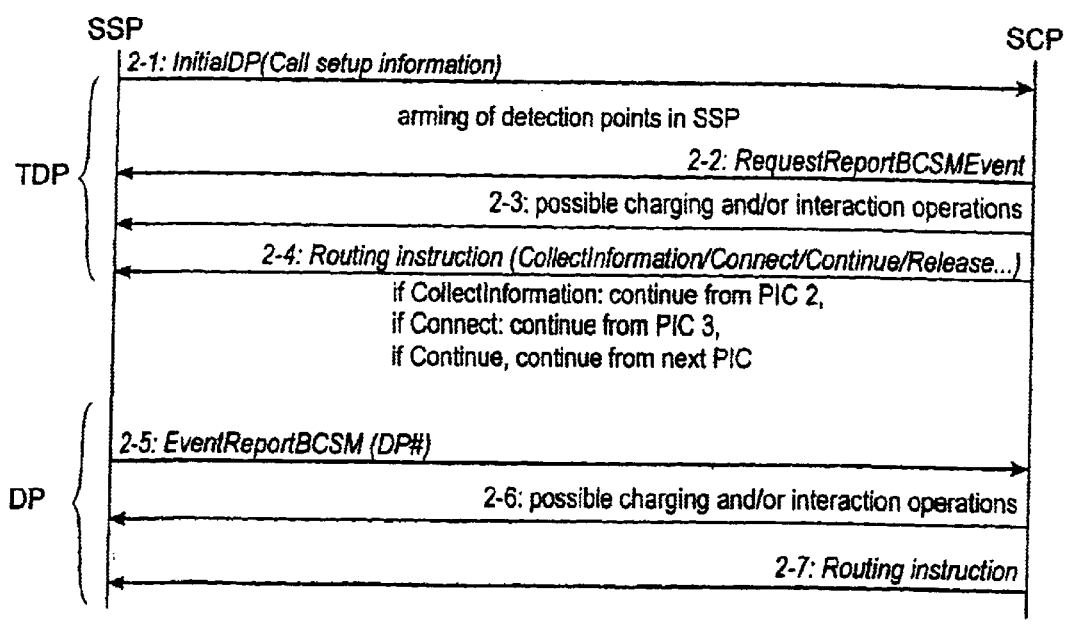
FIG. 2 shows the operation of a prior art intelligent network architecture in detection points.
Figure 4A:
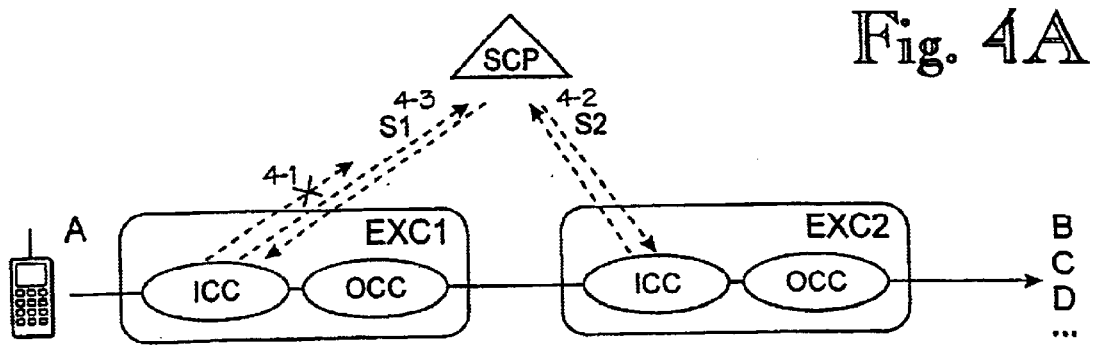
FIG. 4A illustrates the operation of a method in accordance with the invention in a situation in which a first intelligent network service is activated from a second exchange, and a second service from a first exchange.
Figure 4B:
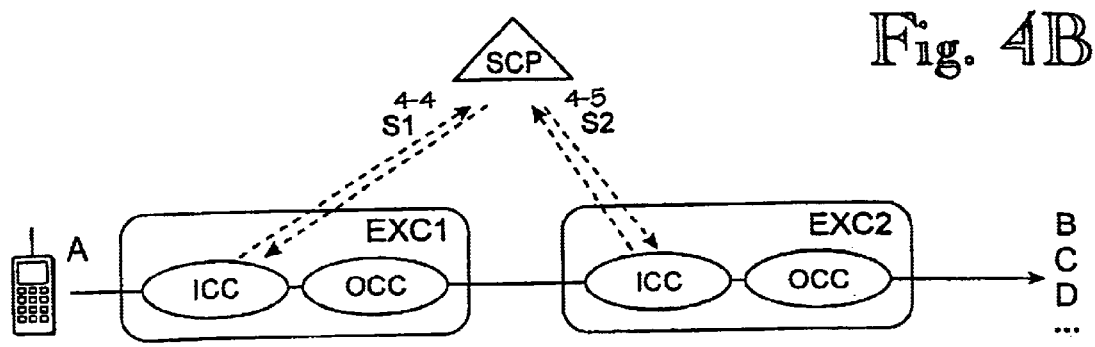
FIG. 4B illustrates the operation of a method in accordance with the invention in a situation in which a first intelligent network service is activated from a first exchange, and a second service from a second exchange.
Figure 5A:
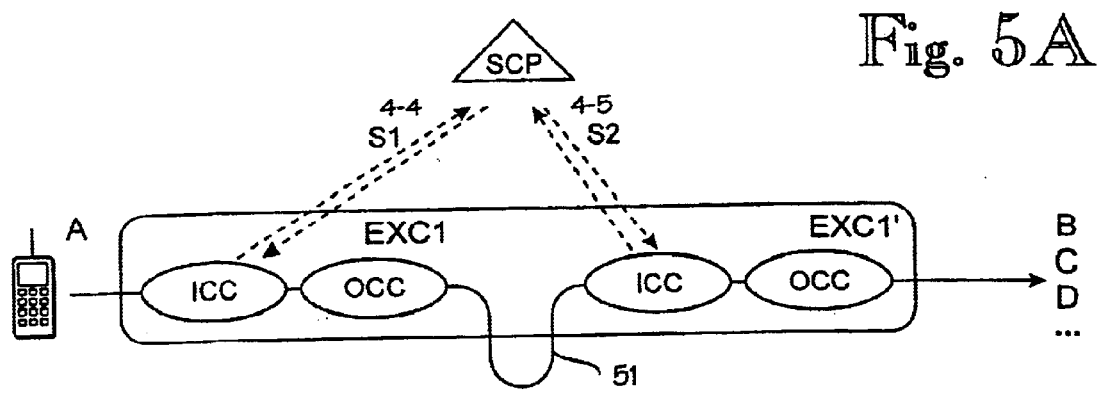
FIG. 5A illustrates a situation in which a call is routed back to the same physical exchange via a trunk circuit loop for providing a first and a second intelligent network service from the same physical exchange.
Figure 5B:
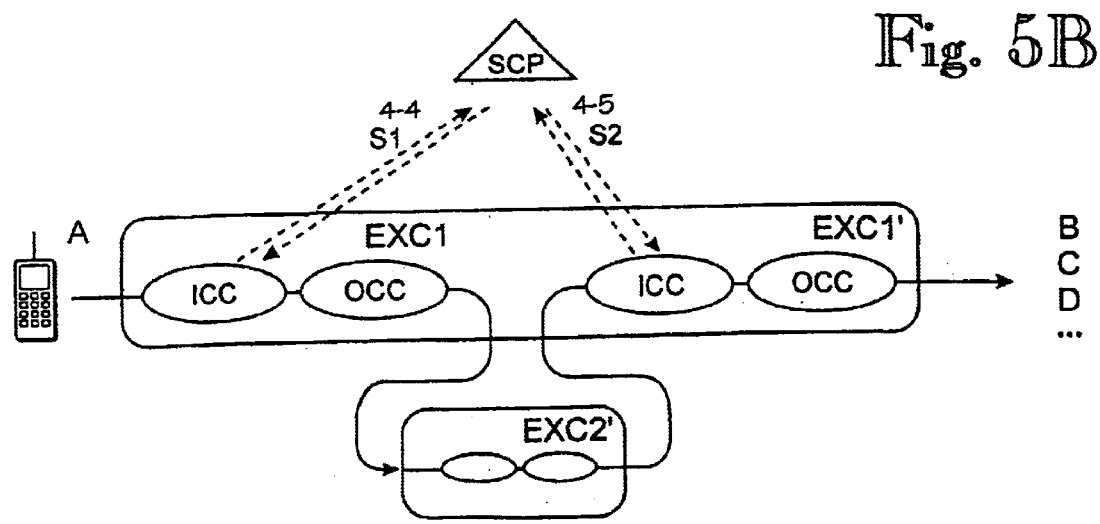
FIG. 5B illustrates a situation in which a call is routed back to the same physical exchange via a switching centre for providing a first and a second intelligent network service from the same physical exchange.
Figure 3:
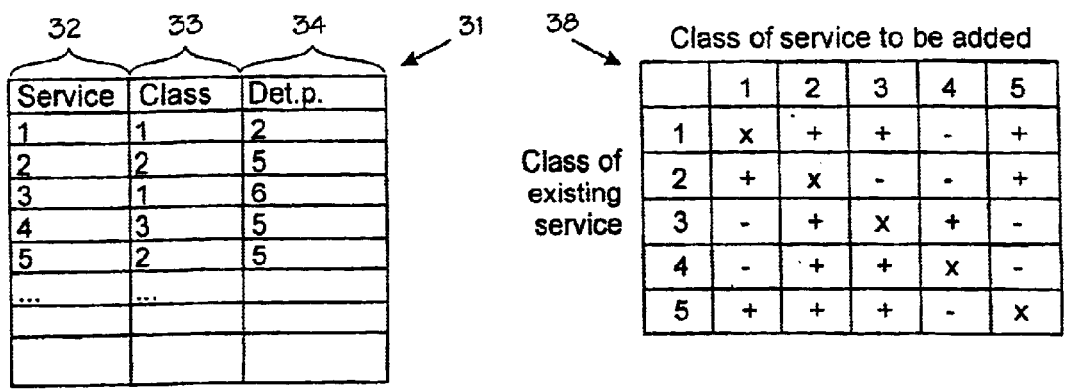
FIG. 3 shows the principle of a compatibility database in accordance with a preferred embodiment of the invention.
Figure 6:
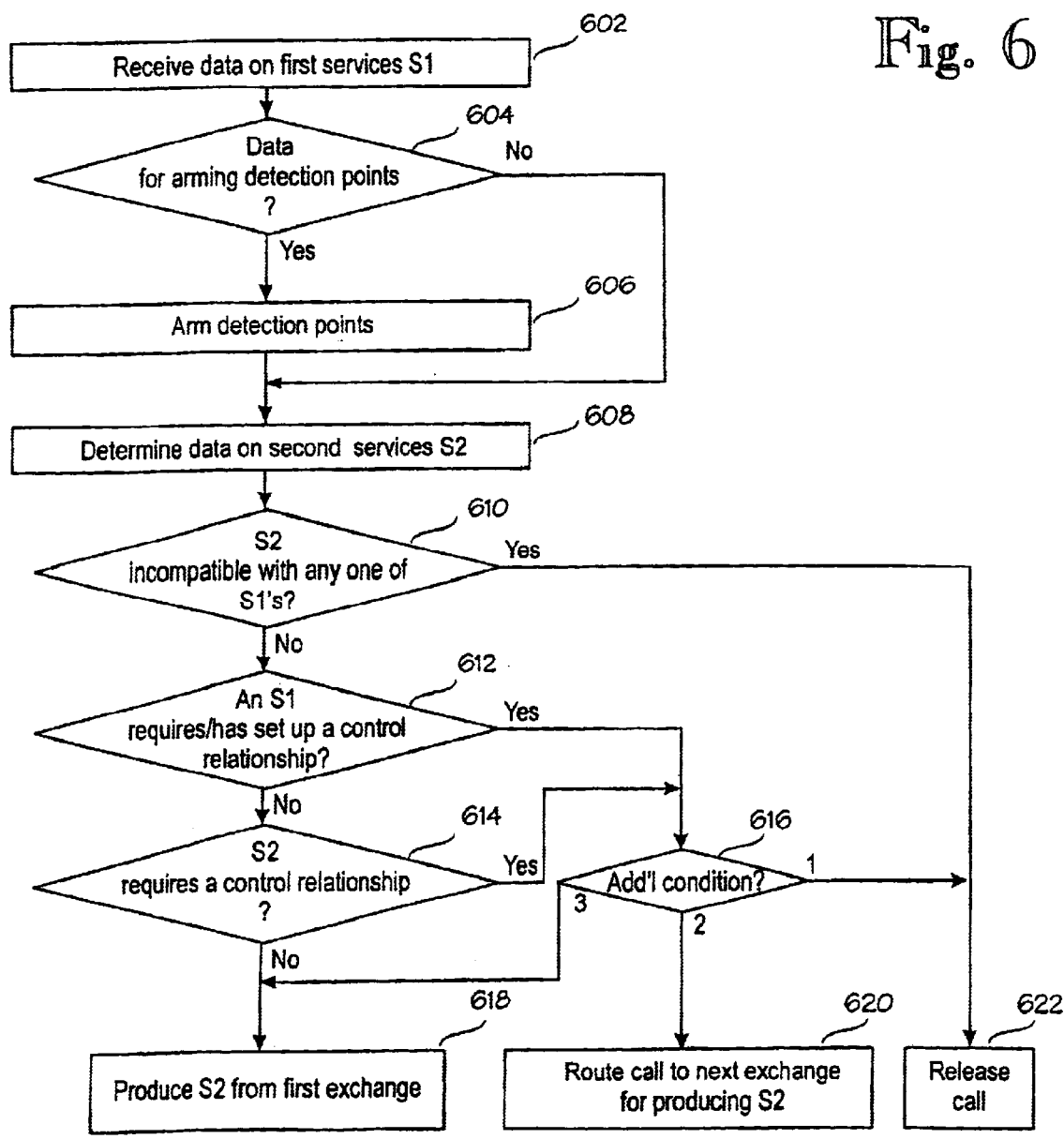
FIG. 6 is a flow diagram illustrating a feasible method for providing services from different exchanges.

With reference to FIG. 3, the compatibility of intelligent network services can be examined by means of a compatibility database formulated as quires a control relationship. If a control relationship is required, a transition to the above step 616 examining the additional condition takes place.

In step 618 the second intelligent network service S2 is provided from the first exchange. This step is achieved if the service S2 is compatible with all S1 services, and in addition at least one of the following is valid: none of the services S1 and S2 requires a control relationship or the additional condition (in step 616) indicates that the service S2 can be provided from the first exchange.

In step 620 the call is routed to the next exchange for providing the service S2. This step is achieved if each of the following is valid: the service S2 is compatible with all S1 services; any one of the S1 or S2 services requires a control relationship and the additional condition (in step 616) indicates that the call is routed to the next exchange for producing the service S2.

In step 622 the call is interrupted. This step is achieved if the service S2 is incompatible with any one of the S1 services.

In accordance with a preferred embodiment the compatibility database 31 to 38, in addition to the pure compatibility data, also comprises data indicating that a list of the first intelligent network services must be sent to the next exchange. Another preferred enhancement is that when the compatibility database 31 to 38 indicates that the call must be routed to the next exchange, the data, such as the number of a calling or called subscriber or the class of the called subscriber, of an initial address message (IAM) to be sent to the next exchange can be converted on the basis of the compatibility database. Providing services in the next phase is facilitated by such modifications. On the basis of the subscriber class, for example, it can be known in the next exchange that for an AdviceOfCharge additional service, pulse messages to the previous exchange must be sent.

What is claimed is:

1. A method for providing at least two intelligent network services in connection with a call in a telecommunications system including at least a first exchange and a next exchange each of the first exchange and the next exchange including an interface to a service control point of an intelligent network, and each of the at least two intelligent network services being associated with at least one corresponding detection point, the method comprising:

dividing the at least two intelligent network services into first intelligent network services and second intelligent network services based on at least one predetermined criterion;

maintaining information on the mutual compatibility of the at least two intelligent network services examining, by the first exchange, in connection with each call which involves at least one first intelligent network service and one second intelligent network service, compatibility of the second intelligent network service with the at least one first intelligent network service; and routing the call to the next exchange or part of the first exchange for activating said second intelligent network service if:

the second intelligent network service is compatible with all of the at least one first intelligent network service, and the second intelligent network service or any one of the at least one first intelligent network service requires a control relationship to the service control point for longer than the a duration of one detection point.

2. A method as claimed in claim 1, further comprising dividing the at least two intelligent network services into second and first intelligent network services depending, correspondingly, on whether data required to activate the at least two intelligent network services can be transmitted on a signaling connection between exchanges.

3. A method as claimed in claim 1 further comprising interrupting the call if the second intelligent network service is incompatible with any one of the at least one first intelligent network service.

4. A method as claimed in claim 1, further comprising keeping data on the compatibility of the at least two intelligent network services in a database.

5. A method as claimed in claim 1, wherein routing the call to the next exchange or part of the first exchange requires meeting an additional condition stored in a database.

6. A method as claimed in claim 1, further comprising obtaining data for arming a detection point associated with the at least one first intelligent network service from a subscriber database, subscriber interface data and/or input line data.

7. A method as claimed in claim 1, further comprising obtaining data for arming a detection point associated with the second intelligent network service on the basis of a selected number analysis and/or subscriber data analysis.

8. A method as claimed in claim 1, wherein said next exchange or part of the first exchange is a next physical exchange in a direction of propagation of the call.

9. A method as claimed in claim 1, wherein said next exchange or part of the first exchange is part of a same physical exchange as the first exchange and the call is routed to this part via a trunk circuit loop.

10. A method as claimed in claim 1, wherein said next exchange or part of the first exchange is part of a same physical exchange as the first exchange and the call is routed to this part via a second physical exchange.

11. A method as claimed in claim 1, wherein said next exchange or part of the first exchange is part of a same physical exchange as the first exchange, and the call is routed to this part internally in the first exchange to its second state model or part of a state model.

12. A method as claimed in claim 11, further comprising dividing the at least two intelligent network services into classes and determining compatibility of the at least two intelligent network services based on compatibility of corresponding classes.

13. A method as claimed in claim 1, further comprising maintaining data indicating that a list of the at least one first intelligent network services must be sent to the next exchange or part of the first exchange, in connection with the information on the mutual compatibility.

14. A method as claimed in claim 1, wherein when the call is routed to the next exchange or part of the first exchange, an item of an initial address message data, is modified based on the information on the mutual compatibility.

15. A method as claimed in claim 14, wherein the item of the initial address message data comprises a number of a calling or called subscriber or a class of a called subscriber.

16. A telephone exchange comprising:

a first interface to a next exchange and a second interface to a service control point of an intelligent network service for providing at least two intelligent network services wherein each of the at least two intelligent network services is associated with at least one corresponding detection point, and the at least two intelligent network services are divided into first and second intelligent network services based on at least one predetermined criterion, and the telephone exchange is arranged to maintain data on mutual compatibility of the at least two intelligent network services wherein:

in connection with each call which involves at least one first intelligent network service and one second intelligent network service, the telephone exchange is arranged to:

examine the compatibility of the second intelligent network service with the at least one first intelligent network service and route the call to the next exchange or part of the first exchange in order to activate said second intelligent network service if:

the second intelligent network service is compatible with all of the at least one first intelligent network service, and the second network intelligent service or any one of the at least one first intelligent network service requires a control relationship to the service control point for longer than the a duration of one detection point.

* * * * *